United States Patent [19]
Thrasher

[11] 3,747,914
[45] July 24, 1973

[54] VIBRATOR ISOLATOR ASSEMBLY
[75] Inventor: Howard G. Thrasher, Los Angeles, Calif.
[73] Assignee: Litton Systems, Inc., Beverly Hills, Calif.
[22] Filed: Sept. 17, 1971
[21] Appl. No.: 181,343

[52] U.S. Cl. ............................. 267/136, 248/358 R
[51] Int. Cl. ........................................... F16g 11/00
[58] Field of Search .................... 267/136, 113, 137; 248/358 R

[56] References Cited
UNITED STATES PATENTS
3,368,807  2/1968  Thrasher ...................... 248/358 R
3,473,766  10/1969  Poole ............................. 248/358 R
2,919,883  1/1960  Murphy .......................... 248/358 R Primary Examiner—James B. Marbert
Attorney—Alan C. Rose, Donald J. Ellingsberg et al.

[57] ABSTRACT

A vibrator isolator assembly that exhibits the characteristics of a low-damped spring at small excursions of a supported mass and the characteristics of a high-damped spring at large excursions.

10 Claims, 2 Drawing Figures

PATENTED JUL 24 1973                    3,747,914

VIBRATOR ISOLATOR ASSEMBLY

BACKGROUND OF THE INVENTION

A vibrator isolator is a mechanical vibration isolator and shock mount that interconnects a support member and a supported member or mass while isolating the supported member from vibration or shock introduced by the support member.

Vibrator isolators are known which exhibit characteristics of a spring and of a damper. A spring without a damper has excellent isolating characteristics at frequencies substantially above the resonant frequency of the mass-spring combination. When a fluid damper such as an air damper or a liquid damper is attached to the spring, the isolating characteristics at high frequencies are degraded. At the resonant frequency of the spring and its attached mass, the excursion of the mass and the transmitted vibration across the isolator builds up to a very large amplitude. The use of a damper limits the amplitude of excursion of the supported mass at frequencies near the resonant frequency of the mass-spring-damper combination.

OBJECTS OF THE INVENTION

Accordingly, it is an object of the invention to provide a new and improved vibrator isolator.

It is an object of the invention to provide a vibrator isolator that exhibits the characteristics of a low-damped spring at small excursions of a supported mass and the characteristics of a high-damped spring at large excursions.

It is an object of the invention to provide a vibrator isolator that isolates vibration and shock.

It is an object of the invention to provide a vibrator isolator that has a substantially low amplitude peak in resonance as a mass-spring system and a fast decay as a mass-spring-damper system with a substantially smooth transistion therebetween.

SUMMARY OF THE INVENTION

Briefly, in accordance with the invention, a new and improved vibrator isolator system is provided having a flexible container filled with a damping fluid and having an irregular shaped dasher penetrating the container and immersed in the fluid so that a supported mass connected to the container is isolated from shock and vibration developed by or transmitted through a support member connected to the dasher.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
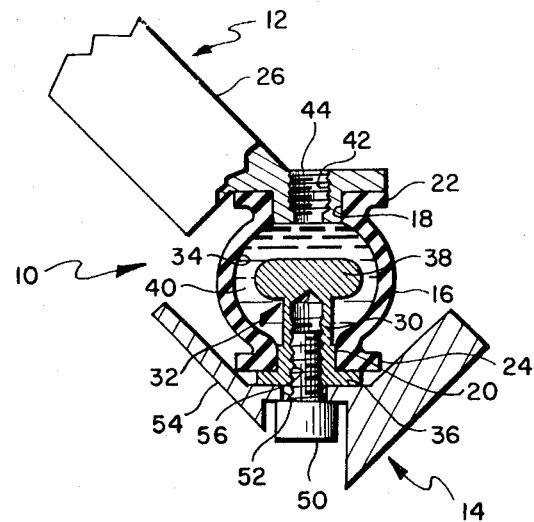
FIG. 1 is an elevation, partly sectional and partly broken away, of the vibrator isolator assembly of the invention in an operating system.

A vibrator isolator assembly 10 as shown by FIG. 1 interconnects a vibration isolated surface or member 12 and a support surface or member 14. The support member 14 is a source of motion, where the motion is either developed by or transmitted by the support member, that is absorbed or damped by the isolator assembly 10 so that the isolated member 12 is maintained as a mass which is substantially, if not totally, isolated from undesirable and unwanted motion such as vibration.

The vibrator isolator assembly 10 has a yieldable fluid container 16 that is formed from a resilient material such as rubber. The fluid container 16 has spaced apertures 18 and 20 that can be generally aligned axially s illustrated. Apertures 18 and 20 have respective flange end surfaces 22 and 24.

Aperture 18 of the isolator assembly 10 is connected in fluid-tight engagement to a strut 26, or the like, of the isolated member 12. Flange end surface 22 also engages the suitably form strut 26 and further ensures the fluid-tight engagement developed between the fluid container 16 and the strut of the isolated member 12.

Aperture 20 of the isolator assembly 10 is connected in fluid-tight engagement to a shank portion 30 of a dasher member 32 that is inserted into a chamber 34 developed by the fluid container 16. Flange end surface 24 engages a complementary flange portion 36 of the dasher member and further ensures the fluid-tight engagement developed between the fluid container 16 and the dasher member 32.

The dasher member 32 of the vibrator isolator assembly 10 as shown by FIG. 1 has a knob or headed portion 38 within the chamber 34. The headed portion 38 can be either regular or irregular; an irregular configuration further increases the total surface area of the dasher member 32 that is exposed within the chamber 34, and increases the efficiency of the vibrator isolator assembly to absorb vibration and shock.

The chamber 34 of the vibrator isolator assembly 10 is filled with a damping fluid 40 that can be either a gas or a liquid. In the illustrated vibrator isolator assembly 10, the damping fluid is a liquid such as oil.

In the vibrator isolator assembly 10 of FIG. 1, the damping fluid 40 is positioned within the chamber 34 through a fill aperture 42 in the strut 26 of the isolated member 12. A removable closure plug 44 engages the fill aperture 42 and develops a fluid-tight seal to retain the damping fluid 40 within the chamber 34.

The vibrator isolator assembly 10 of FIG. 1 and the isolated member 12 are preassembled as an operating unit. However, it is contemplated that the isolator assembly can be an independent assembly adapted for connection between adjacent components so that the interconnected components are maintained in a spaced and motion-isolated relationship relative to each other.

The preassembled vibrator isolator assembly 10 and isolated member 12 are connected to the support member 14 by a fastener such as threaded cap screw 50 that passes through a clear hole 52 in a strut 54, or the like, of the support member. The cap screw 50 is threaded into a tapped hole 56 formed in the dasher member 32 which completes the desired interconnection of the isolated surface and the support surface by the vibrator isolator assembly 10 of the invention.

Figure 2:
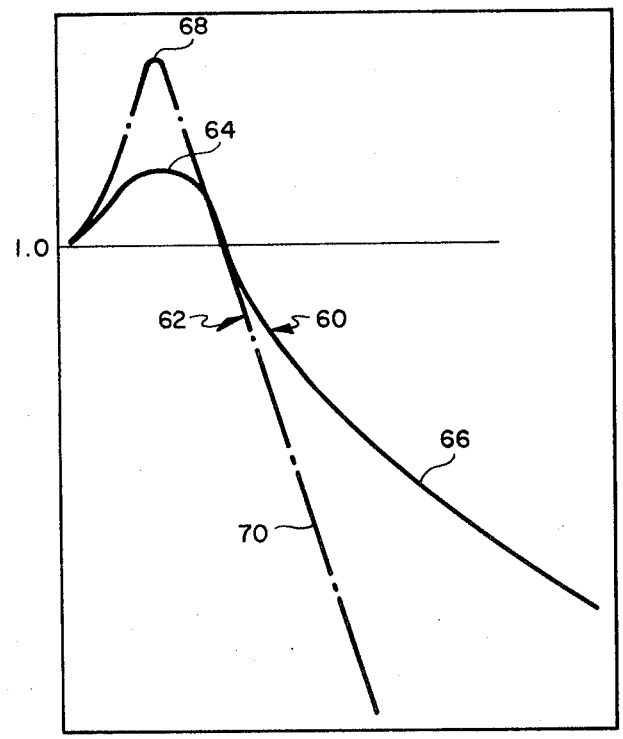
FIG. 2 is a graphical representation of curves developed by vibrator isolators of the prior art and of the invention.

In FIG. 2, curves 60 and 62 represent the operating characteristics of prior art vibrator isolators.

The datum or reference line designated as 1.0 by FIG. 2 reflects a relationship between the movement of a support member, such as support member 14 of FIG. 1, as an input, and the movement of a supported or isolated member, such as isolated member 12 of FIG. 1, as an output; the relationship exhibits no relative displacement of one member to the other member. Above the reference line 1.0, input amplitude is small relative to output amplitude which is large; the resonance of the system. Below the reference line 1.0, the more rapid decay, which is desirable, is reflected by a fast fall-off or mear vertical slope of that portion of a curve below the reference line.

Curve 60 of FIG. 2 as developed by a prior art vibrator isolator formed from a relatively high damping material, such as high-damp rubber, develops a low peak 64 at resonance and a relatively slow fall-off or "horizontal" slope 66 in decay.

Curve 62 of FIG. 2 as developed by a prior art vibrator isolator formed from a relatively low damping material, which can be a metal, develops a high peak 68 at resonance and a relatively fast fall-off or "vertical" slope 70 in decay.

The desired operating curve for a vibrator isolator would be a composite curve. The composite curve would exhibit a curve portion having a low amplitude peak at resonance, such as the low amplitude peak 64 of curve 60 as shown by FIG. 2, and a curve portion having a fast fall-off slope in decay, such as the fast fall-off slope 70 of curve 62. Although such a composite curve has not been satisfactorily developed heretofore by known vibrator isolators, such a desirable composite curve is developed by the vibrator isolator assembly of the invention, particularly the vibrator isolator assembly 10 as illustrated by FIG. 1 and as described hereinbefore.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A vibrator isolator assembly for interconnection between a support member and a supported member, the assembly comprising:
   a. spring means absorbing at least vibration and shock, said spring means including:
      1. a flexible container means having flexible walls developing a chamber therein and exhibiting predetermined spring-rate characteristics and further having at least a first aperture to said chamber,
   b. damper means further absorbing at least vibration and shock, said damper means including:
      1. damping fluid positioned within said flexible chamber,
      2. dasher means exhibiting predetermined damping characteristics connected in fluid-tight engagement with said first aperture of said container means and extending into said chamber, and
      3. an increased surface portion on said dasher means,
      4. at least said increased surface portion totally immersed in said damping fluid,
   c. said spring means connected to one of the members and said dasher means connected to the other one of the members so that the vibrator isolator assembly interconnects the support member and the supported member and absorbs at least imposed vibration and shock.

2. The vibrator isolator assembly of claim 1 in which said dasher means is a dasher having an elongated shank portion connected to said container means and having a knob portion extending from said shank portion as said increased surface portion.

3. The vibrator isolator assembly of claim 1 in which said increased surface portion has a regular surface.

4. The vibrator isolator assembly of claim 1 in which said increased surface portion has an irregular surface.

5. The vibrator isolator assembly of claim 1 in which said flexible container means is a rubber container.

6. The vibrator isolator assembly of claim 1 in which said flexible container means is a yieldable metal container.

7. The vibrator isolator assembly of claim 1 in which said damping fluid is a liquid.

8. The vibrator isolator assembly of claim 7 in which said damping fluid is oil.

9. A vibrator isolator assembly for interconnection between a support member and a supported member, the assembly comprising:
   a. flexible container means having flexible walls exhibiting predetermined spring-rate characteristics,
   b. a flexible chamber developed by said flexible container means having at least first and second apertures to said chamber,
   c. a damping fluid positioned within said chamber,
   d. dasher means exhibiting predetermined damping characteristics connected in fluid-tight engagement with said first aperture and extending into said chamber,
   e. an increased surface portion on said dasher means,
   f. at least said increased surface portion being totally immersed in said damping fluid, and
   g. said container means connected by fluid-tight engagement with said second aperture to one of the members and said dasher means connected to the other one of the members so that the vibrator isolator assembly interconnects the support member and the supported member and absorbs at least imposed vibration and shock.

10. The vibrator isolator assembly of claim 9 in which said second aperture is a fill aperture for the selective passage of said damping fluid.

* * * * *